United States Patent [19]
DeVane et al.

[11] Patent Number: 5,548,719
[45] Date of Patent: *Aug. 20, 1996

[54] SYSTEM AND METHOD FOR ANALYZING LARGE LOGIC TRACE ARRAY

[75] Inventors: Charles J. DeVane, Maynard; Arthur J. Beaverson, Milford, both of Mass.

[73] Assignee: Digital Equipment Corporation, Maynard, Mass.

[ * ] Notice: The term of this patent shall not extend beyond the expiration date of Pat. No. 5,299,206.

[21] Appl. No.: 422,742

[22] Filed: Apr. 14, 1995

Related U.S. Application Data

[63] Continuation of Ser. No. 781,987, Oct. 24, 1991, abandoned.

[51] Int. Cl.[6] ........................... G01R 31/28; G06F 11/00
[52] U.S. Cl. ..................... 395/183.15; 371/22.1
[58] Field of Search ...................... 371/22.1, 19, 15.1, 371/20.1; 395/575, 183.15, 20.1, 22.1

[56] References Cited

U.S. PATENT DOCUMENTS

| | | | |
|---|---|---|---|
| 3,568,156 | 3/1971 | Thompson | 340/172.5 |
| 4,241,402 | 12/1980 | Mayper | 364/200 |
| 4,475,237 | 10/1984 | Glasby | 371/22.1 X |
| 4,636,940 | 1/1987 | Goodwin | 364/200 |
| 4,748,556 | 5/1988 | Hoeren | 364/200 |
| 4,764,863 | 8/1988 | Silverthorn | 364/200 |
| 4,882,699 | 11/1989 | Evensen | 379/284 |
| 5,138,669 | 8/1992 | Shimura | 382/37 |
| 5,140,644 | 8/1992 | Kawaguchi | 382/10 |
| 5,299,206 | 3/1994 | Beaverson | 371/22.1 |

*Primary Examiner*—Robert W. Beausoliel, Jr.
*Assistant Examiner*—Glenn Snyder
*Attorney, Agent, or Firm*—Kenyon & Kenyon

[57] ABSTRACT

A system and method for analyzing large logic traces, with the system having an input for regular expressions, a generator for receiving the regular expressions and generating finite automata which use arithmetic/logic expressions that permit the use of a substantially infinite alphabet, an input for a large trace array, and an analyzer for searching the large trace array with the finite automata, with the analyzer producing results of the search.

12 Claims, 6 Drawing Sheets

SYSTEM AND METHOD FOR ANALYZING LARGE LOGIC TRACE ARRAY

This application is a continuation of application Ser. No. 07/781,987, filed on Oct. 24, 1991, now abandoned.

FIELD OF THE INVENTION

The present invention relates to systems and methods that are useful in analyzing trace arrays of computers or other digital circuits under test. More specifically, the present invention relates to systems and methods that are useful in analyzing large logic trace arrays of the behavior of computers or other digital circuits under test.

BACKGROUND OF THE INVENTION

In the development of new electronic products, it is necessary to test and debug both the hardware and software of these products. These testing and debugging operations are key factors to bringing new products to market.

To perform these testing and debugging operations on computers or digital circuits, engineers frequently use an instrument called a "logic analyzer." In its most common use, a logic analyzer periodically samples (or captures) and stores the states of several digital signals at the same time.

In use, a logic analyzer records or "traces" the behavior of the computer or digital circuit over a period of time. To do this, the logic analyzer is periodically activated to sample the states of a predetermined number of digital signals.

The record of the computer's or digital circuit's behavior over a prescribed period of time is referred to as a "logic trace." Such an array may also be referred to as a "logic trace array" or simply a "trace array". Since this array only contains "0s" and "1s," a trace array also may be referred to as a "binary array." Although there may be various ways of organizing a trace array, a preferred method is a two dimensional array such as the representative prior art trace array shown in FIG. 1.

In FIG. 1, the representative trace array is shown generally at 100. Each entry in the array is either "1" or "0," and represents the state of one digital signal from a computer or other digital circuit at one point in time. The trace array at 100 has representative rows 102, 104, 106, 108, 110 and 112, and representative columns 114, 116, 118, 120, 122, and 124.

In the trace array at 100, all of the entries for one signal are kept in a single column in the order in which sampling takes place. This is so each column traces the behavior of one particular digital signal over time. Each row contains the state of all the signals at one particular point in time. As such, a row is a "sample" of all the signals at a particular point in time.

For many years, logic analyzers could collect only small arrays such as that shown in FIG. 1. That is, logic analyzers could only store arrays having up to 4,096 to 8,192 samples (rows) and 48 to 64 signals (columns). Arrays of this size could be printed out on paper and then analyzed by hand to understand the circuit behavior recorded in the trace array. This permitted desired signal patterns to be viewed and evaluated with little trouble for their frequency and affect on the computer or digital circuit being tested.

It has been found that the usefulness of logic trace arrays of the size shown in FIG. 1 is limited for testing and debugging purposes because such traces cover only a very small time window of sampled data. Therefore, in many cases, very complex circuit problems could not be solved using these small size trace arrays. Hence, it is desirable to have a much larger time window of captured data for analyzing more complex circuit behavior and a method to analyze large trace arrays that provide larger time windows.

Today, we have logic analyzers that generate much larger trace arrays than that shown in FIG. 1. These new powerful tools provide much larger time windows for data acquisition for sampling the behavior of computers or digital circuits. For example, logic analyzers now have been built to collect trace arrays as large as 524,288 samples of 192 signals, or 2,097,152 samples of 64 signals. These trace arrays, however, are too large to print out on paper and analyzer by hand. There is a need for a practical and an efficient way to analyze these larger trace arrays that heretofore has not been available. A consideration may be to look to known pattern searching methods such as those used for searching text files.

A known method for searching for particular patterns in text files is to define the desired pattern as a regular expression. From the regular expression, a finite automaton is generated. The finite automaton then is used to search the text file for the desired pattern.

Regular expressions are a useful way to describe the kinds of patterns engineers search for when analyzing trace arrays. Furthermore, using finite automata generated from regular expressions is an efficient technique for pattern searching.

A regular expression is compiled into a recognizer that is used for pattern searching by constructing a transition diagram that is called a finite automaton. A recognizer is a program that takes an input string and answers "yes" if the string matches a pattern specified by a regular expression and "no" otherwise. A transition diagram or finite automaton depicts the actions that take place in the recognizer in the acquisition of tokens. A token is a sequence of characters having a collective meaning.

FIG. 2 shows a prior art method for searching text files in the above described manner and FIG. 3 shows an apparatus for implementing this method. Referring to FIG. 2, the prior art searching method is shown generally at 200. At step 1 at 210, regular expressions that define the patterns to be searched for are input to an appropriate apparatus designed and configured to conduct the search. At step 2 at 220, the regular expressions that are input to the apparatus are used to generate conventional finite automata. Step 3 at 230 is where the text file to be searched is input to the apparatus capable of conducting the search. This also is where the text file is searched for the desired patterns. Following this, at step 4 at 240, the results of the search are output from the searching apparatus.

Referring to the FIG. 3, a block diagram of the system for implementing the method of FIG. 2 is shown generally at 250. The regular expressions based on the patterns to be searched for are input to the apparatus at regular expression input 251 and then placed on line 252. The regular expressions constitute the first input to system 250.

The regular expressions on line 252 are input to generator 254 that generates conventional finite automata from these regular expressions. The conventional finite automata are output from generator 254 on line 256. The finite automata just generated are input to analyzer 260.

The second input to system 250 is the text file that is to be searched. It is input at text file input 257. The text file input connects to line 258, so the text file on line 258 is input to analyzer 260. Analyzer 260 uses the conventional finite automata to search the text file for patterns. The results of the search are output from analyzer 260 on line 262.

Lexical analyzers used in compilers often use an extension of this method to search text files. Lexical analyzers combine the finite automata from several regular expressions into a single finite automaton to partition the text file into a series of tokens. Each character of the text file is placed into exactly one token. No character is ever placed in two or more tokens. Therefore, no two tokens in the series overlap. The techniques of the prior art may be applied to trace arrays by considering tokens as events. Hence, a series of tokens may be viewed as a series of non-overlapping events.

These methods of handling text files discussed above are discussed in Aho et al., "Chapter 3: Lexical Analysis," *Compilers: Principles, Techniques, and Tools*, Addison-Wesley, 1986, and other sections of this text.

Referring now generally to the treatment of text files in the past, text files have been treated as a string of symbols. These symbols are based on alphabets of finite size. For example, a text file that is input on line 258 of system shown in FIG. 3 may be an ASCII text file. Each ASCII character of the ASCII character set is treated as one symbol. The ASCII character set is a finite alphabet that contains 128 characters as will be shown.

A finite automaton as it has been used in the prior art consists of:

1. A set of states "s."
2. A finite set of input symbols that constitutes the input symbol alphabet.
3. A transition function that maps state-symbol pairs to sets of states.
4. A state "$s_0$" which is the start state.
5. A set of states "F" that are the accepting states.

In FIG. 4, an example of a finite automaton represented in a transition graph for the regular expression (a|b)*abb is shown generally at 275. In that Figure, the nodes are the states and the labeled edges are transitions.

The regular expression (a|b)*abb is the set of all strings of a's or b's ending in abb. In defining the finite automaton as represented in the transition graph of FIG. 4, the set of states are {0, 1, 2, 3}, the input symbol alphabet is {a,b}, the start state is $s_0$, and the accepting state is $s_3$. The transition function may be represented by the transition table at Table 1.

TABLE 1

| State | Input Alphabet Symbol | |
|---|---|---|
| | a | b |
| 0 | {0,1} | {0} |
| 1 | — | {2} |
| 2 | — | {3} |

A transition function as used in this capacity specifies for each transition function pair (s,a), where "s" is a state of the finite automaton and a is a particular symbol of the finite input alphabet, the next state of the finite automaton. Consider, for example, a finite automaton with the transition function f(s,a). If the finite automaton is in state "$s_1$" and reads input symbol a, and f($s_1$, a)=$s_2$, then the finite automaton will go to state $s_2$.

In the prior art, it has been important that the symbols for use with a finite automaton come from a finite alphabet. If they do not and come from an input alphabet of infinite size, the transition function also will be of an infinite size; and as such, a system such as that shown at 250 (FIG. 3) could not implement the transition function. As will now be shown, even though a large trace array may be presented in the same manner as text files, it does not mean that these large trace arrays may be analyzed in the same manner as conventional text files because of the inability of the prior art methods to be able to use infinite alphabets.

A representative ASCII file will now be discussed to demonstrate the inability of prior art text file searching methods to search or analyze large trace arrays. In ASCII text files, each ASCII character is represented by a 7-bit code. For the purpose of this example, the ASCII text file contains 100 characters. The text file, therefore, may be represented by an array containing 100 rows and 7 columns. Each row may store a single character from the text file; and, thus, each row may represent a single symbol of the input alphabet. The first character of the text file goes in the first row of the array, the second character goes in the second row, and so on for the 100 characters. Hence, reading the array from the first to the last row is the same as scanning the text file from beginning to end.

Now to consider representing a large trace array as a text file. If a trace array contains 192 columns and 524,288 rows, in the text file context, each row will represent one character of a character set. Thus, the trace array may be presented as a text file containing 524,288 characters and each character has a 192-bit code.

In analyzing conventional text files, a first given is that the text file uses a finite alphabet. The ASCII character set that uses a 7-bit code per character will have $2^7$ or 128 characters in that set. The transition function is relatively easy to implement for finite automata using this ASCII character set as an input symbol alphabet.

On the other hand, the character set for the large trace array discussed above has a 192-bit code for each character. As would be known, the character set using 192-bit codes would contain $2^{192}$ or 6,277,101,735,386,680,763,835,789, 423,207,666,416,102,355, 444,464,034,512,896 characters, which for all practical purposes is an infinite character set. Given this character set size, it would be extremely difficult, if not impossible, to implement a transition function for a finite automaton using such a character set as an input symbol alphabet.

The present invention overcomes the problems that have been described and provides a system and method to automatically and efficiently analyze large trace arrays.

SUMMARY OF THE INVENTION

The present invention is a system and method for analyzing large trace arrays, for example, that approach the size of 192 columns (signals) and 524,288 rows (samples), or 64 columns (signals) and 2,097,152 rows (samples). In order to be able to search and analyze logic trace arrays of this size (which far exceed the limits of conventional finite alphabets), this system and method make use of finite automata that use arithmetic/logic expressions, instead of symbols, which enable the use of a substantially infinite alphabet. More specifically, the transition function that is used with a finite automaton specifies for each transition function pair (state-expression), what the next state is, but the transition function does so by using arithmetic/logic expressions rather than input symbols from a finite alphabet; thereby overcoming restrictions in prior art systems and methods to only use a finite alphabet.

The use of arithmetic/logic expressions with finite automata permits the automatic and efficient searching, and analysis of large trace arrays that heretofore were difficult, if not impossible, to search with conventional text file searching methods. The finite automata that use arithmetic/logic expressions as described are used in the system and method of the present invention to give engineers the tools to craft specifically tailored searches to obtain the desired information from large trace files.

BEST MODE FOR CARRYING OUT THE PRESENT INVENTION

The present invention is a system and method that are useful for searching and analyzing large trace arrays.

Figure 1:
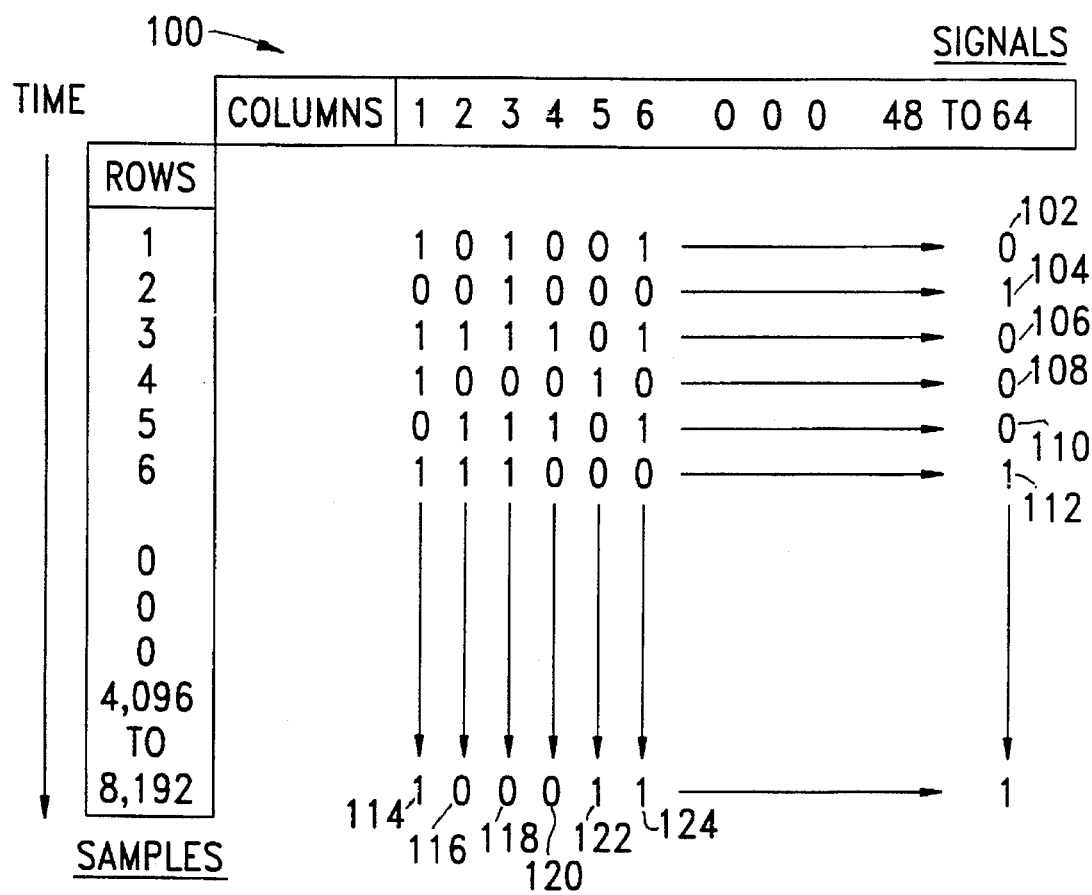
FIG. 1 shows a representative conventional prior art trace array that has 48 to 64 signals (columns) and 4,096 to 8,192 samples (rows).
Figure 3:
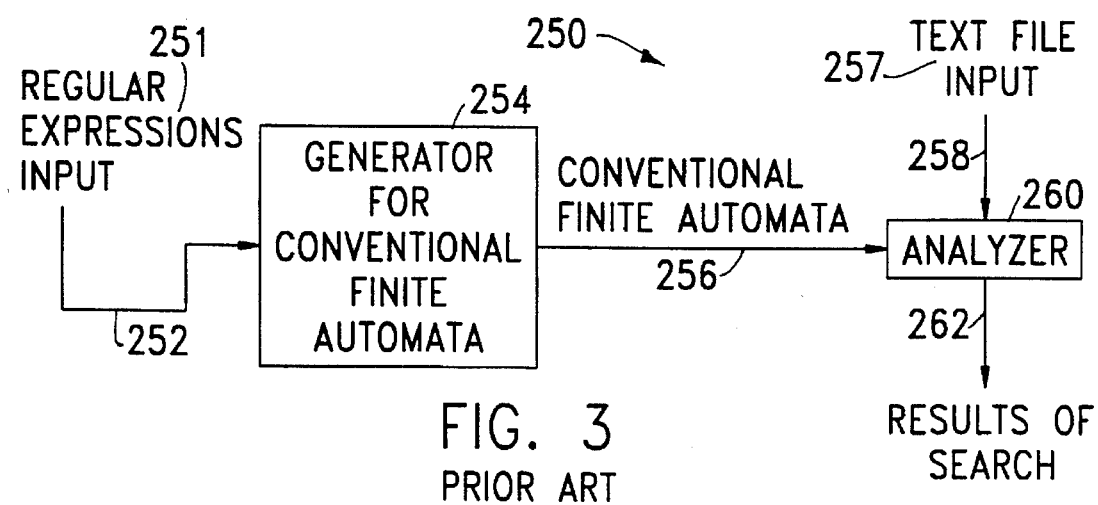
FIG. 3 is a block diagram of a prior system implementing the prior art method shown in FIG. 2.
Figure 2:
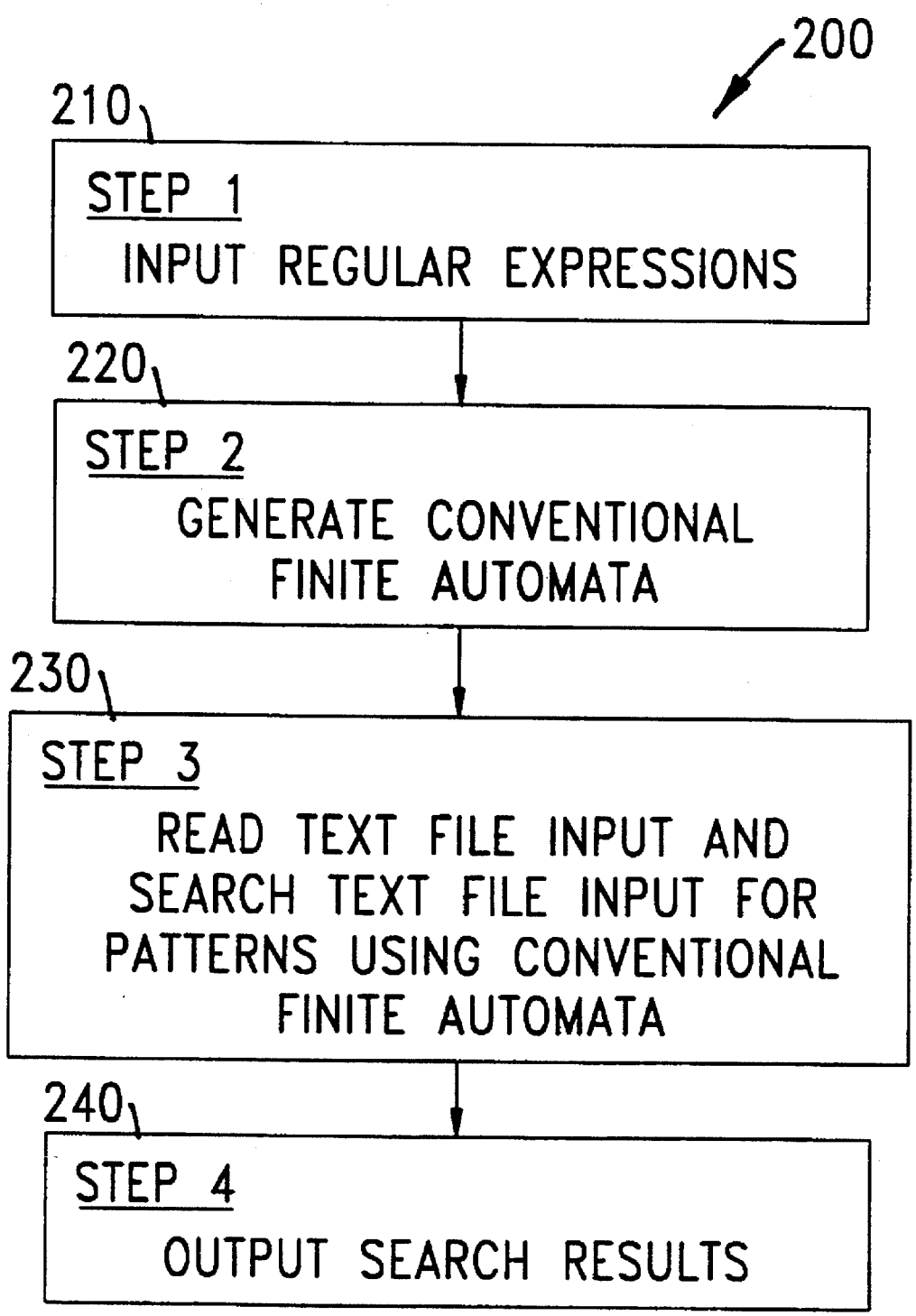
FIG. 2 shows the steps of a prior art method for searching texts files.
Figure 4:
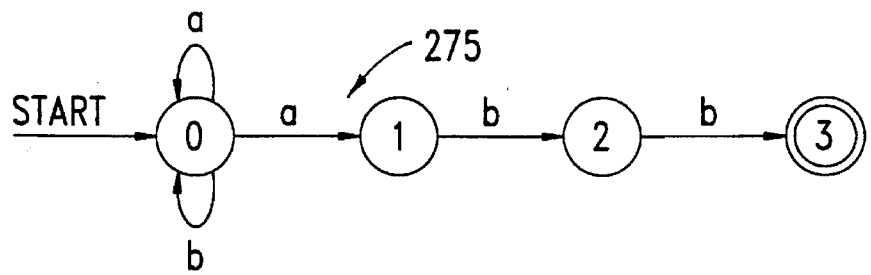
FIG. 4 is a transition graph for a finite automaton that recognizes the regular expression (a|b)*abb.
Figure 5:
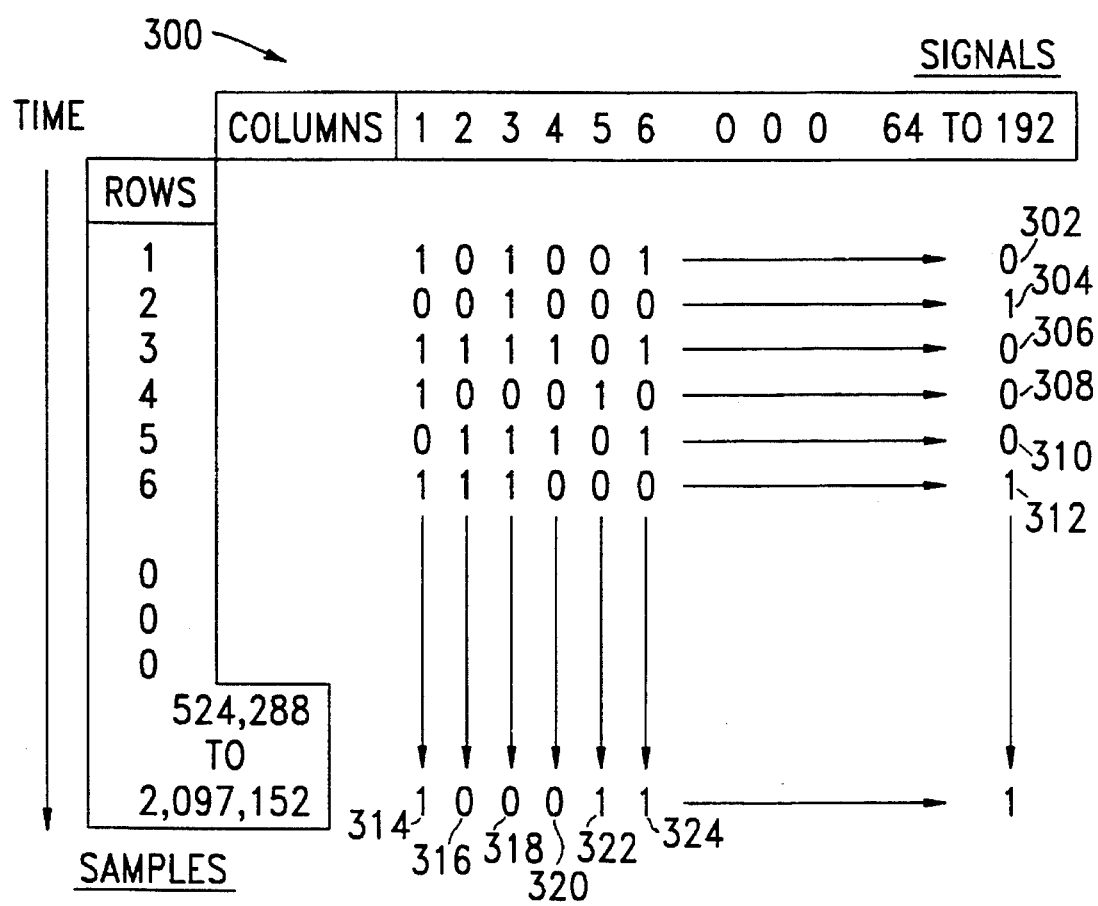
FIG. 5 shows a representative large trace array that now is able to be searched using the system and method of the present invention.

Referring to FIG. 5, a representative large trace array of the type that may be automatically and efficiently searched and analyzed using the system and method of the present invention is shown generally at 300. Large trace array 300 has representative rows 302, 304, 306, 308, 310, and 312 of the total number which may range from 524,288 to 2,097,152. The rows represent the number of samples that are taken of all signals. The large trace array also has representative columns 314, 316, 318, 320, 322, and 324 of the total number which may range from 64 to 192. The columns represent the number of signals that are sampled at a given point in time.

According to the present invention, the finite automata that are generated from the regular expressions consist of the following:

1. A set of states "s."
2. A set of arithmetic/logic expressions (which permit use of a substantially infinite alphabet).
3. A transition function that maps the state-arithmetic/logic expression pair to sets of states.
4. A starting state.
5. An accepting state.

As should be noted, the transition function immediately above is different from the transition function defined by f(s,a). The transition function of the finite automata following the present invention specifies for each transition function pair, what the next state of a finite automaton will be based on (s,e), where "s" is the state of the finite automaton and e is an arithmetic/logic expression.

The use in the transition function of the present invention of e, an arithmetic/logic expression, instead of a, a particular symbol of the finite input alphabet, permits an expansion of the transition function to embrace the use of a infinite alphabet. Therefore, for example, considering a finite automaton with a transition function f(s,e), if the finite automaton is in state "$s_1$" and the arithmetic/logic expression e evaluates to "true" for the present input symbol (row of the trace array), and $f(s_1, e) = s_2$, then the finite automaton will go to state $s_2$.

The arithmetic/logic expressions that are used with the finite automata according to the present invention are composed of fields, numbers, and arithmetic and logic operators. Fields are numbers that are constructed bitwise by extracting bits from an input symbol, which is a row of the trace array. The use of fields permits a single signal or the entire group of signals of a row to be tested or analyzed. Fields are shown subsequently in describing FIG. 6B.

The numbers and operators that are used in the arithmetic/logic expressions are according to those used in programming languages such as "C." Numbers are unsigned integers that may be decimal, octal, hemidecimal, or binary. The arithmetic and logic operators may include those shown in Table 2.

TABLE 2

| OPERATORS | FUNCTIONS |
| --- | --- |
| + | addition |
| - | subtraction |
| * | multiplication |
| / | division |
| % | modulus |
| & | bit AND |
| \| | bit inclusive OR |
| ^ | bit exclusive OR |
| ~ | bit complement |
| && | logical AND |
| \|\| | logical inclusive OR |
| ! | logical NOT |
| << | shift left |
| >> | shift right |
| < | less than |
| > | greater than |
| <= | less than or equals |
| >= | greater than or equals |
| == | equals |
| != | not equals |
| ( ) | grouping |

The precedence for these operators when used in arithmetic/logic expressions is set forth in Table 3.

TABLE 3

| Operator | Precedence |
| --- | --- |
| ( ) | Highest |
| !,~ | |
| *,/,% | |
| +,- | |
| <<,>> | |
| <,<=,>,>= | |
| ==,!= | |
| & | |
| ^ | |
| \| | |
| && | |
| \|\| | Lowest |

The arithmetic and logic operators operate the following preferred ways on their operands. The operators (+, -, *, /, %) treat their operands as unsigned integers and produce a result that is an unsigned integer.

The shift operators (<<,>>) treat their operands as unsigned integers and produce unsigned integers. Right shifting shifts "0s" into the most significant bit (MSB) of the result, and left shifting shifts "0s" into the least significant bit (LSB) of the result.

The comparison operators (<,>,<=,>=, !=) treat their operands as unsigned integers and produce a boolean result. That is, if the comparison is true, the value of the result is "1", otherwise the value of the result is "0." These operators always produce a value of "1" or "0."

The bit operators (&, |, ^, ~,) treat their operands as bit fields and perform their operations bit-by-bit.

Logical operators (&&, ||, !) treat their operands as booleans and produce a boolean result. If the operand is equal to "0," it is taken as false, otherwise it is taken as true ("1"). If the result of the operation is logically false, the value of the result is "0," otherwise the value of the result is "1." These operators always produce a value of "1" or "0."

For joining or dealing with more than one pattern, arithmetic/logic expressions may be combined using operators for concatenation, alternation, and repetition. These arithmetic/logic expressions when joined with the concatenation, alternation, and repetition operators form regular expressions according to the present invention. Following the present invention, the simplest form of a regular expression is a single arithmetic/logic expression.

In Table 4 below, the operator "or" is associated with alternation, the operator "then" is associated with concatenation, and the operator "{}" is associated with repetition. The symbols a and b represent regular expressions.

TABLE 4

| Concatenation | a then b |
| Alternation | a or b |
| Repetition | a{ } |

Concatenation uses the operator "then" to join two patterns in series. In searching using concatenation, the system searches for the sequence of the two patterns.

Alternation is associated with the operator "or." This joins two patterns in parallel and causes the system to search for a match of either of the two patterns.

The repetition is for determining the maximum and minimum number of a repeated pattern.

Figure 6A:
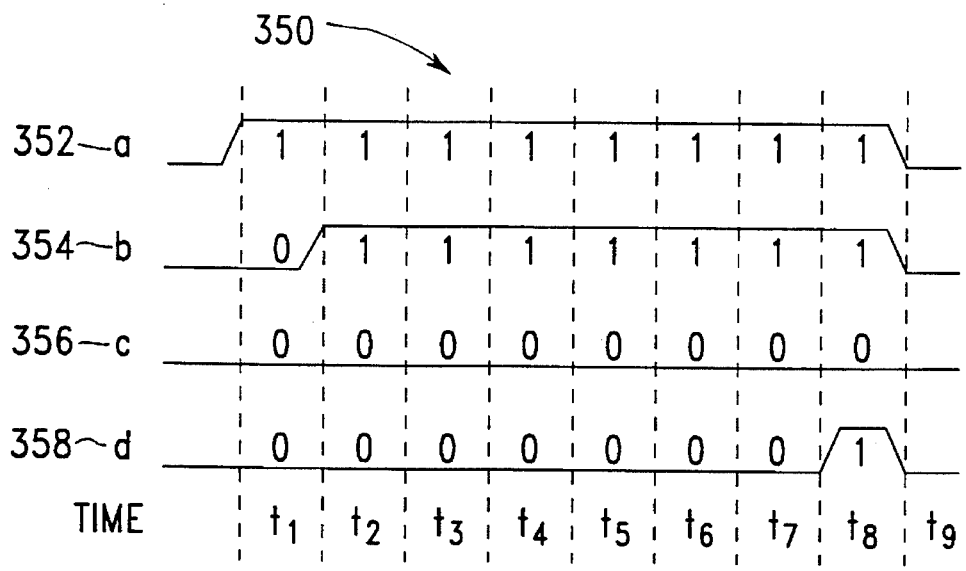
FIG. 6A is a representative timing diagram for four representative signals that are part of a larger number of signals.

Referring to FIG. 6A and B, regular expressions that use "then," "or," and "{}" operators, and arithmetic/logic expressions using fields, numbers, and arithmetic and logical operators will be discussed. In FIG. 6A, the partial traces for four of 64 signals that have been sampled 8 times are shown generally at 350. The signals are a, b, c, and d. As shown, the a signal is at 352, the b signal is at 354, the c signal is at 356, and the d signal is at 358. Since time progresses to the right in FIG. 6A, the trace can be partitioned vertically into slices as shown.

Figure 6B:
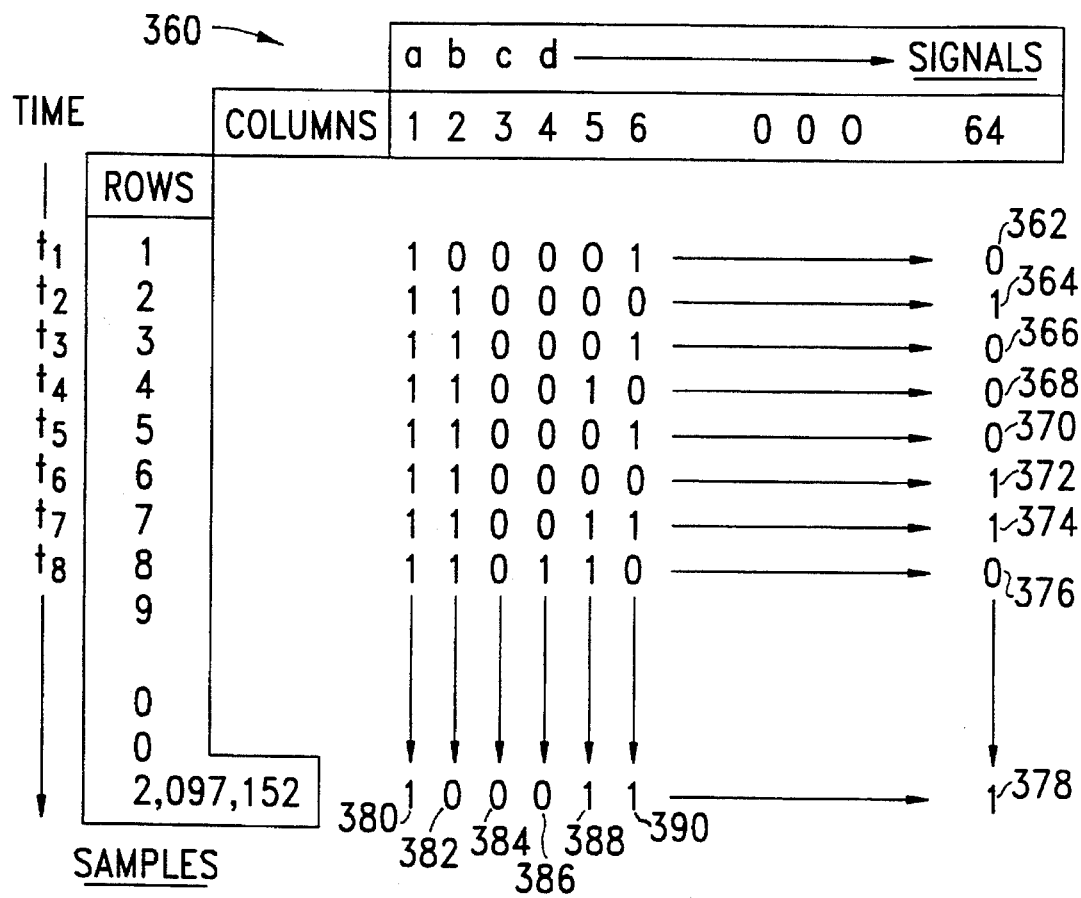
FIG. 6B is a trace array for the signals shown in FIG. 6A

The state of signals a, b, c, and d in FIG. 6A also may be presented in a trace array as shown in FIG. 6B assuming that these signals are sampled at times shown. FIG. 6B has representative rows 362, 364, 366, 368, 370, 372, 374, 376, and 378; and representative columns 380, 382, 384, 386, 388, and 390.

As shown, signals a, b, c, and d are single bit signals so fields representing these signals will also be of one bit. For example, the fields for these signals are:

$$\text{field a 1,1} \tag{1}$$

$$\text{field b 2,1} \tag{2}$$

$$\text{field c 3,1} \tag{3}$$

$$\text{field d 4,1} \tag{4}$$

where in field (x) (y,z):

x=Field name.

y=Leftmost bit of the field.

z=Bit length of the field.

As such, when signals that have a larger number of bits are considered, the desired field of these signals may be specified in this manner.

By way of example, possible regular expressions for finite automata that may be used to search a trace array for what is represented at time $t_1$, $t_2$, and $t_8$, respectively, for signals a, b, c, and d are the following:

At $t_1$:

$$\text{(a \&\& !b \&\& !c \&\& !d)} \tag{5}$$

At $t_2$:

$$\text{(a \&\& b \&\& !c \&\& !d)} \tag{6}$$

At $t_8$:

$$\text{(a \&\& b \&\& !c \&\& d)} \tag{7}$$

It should be understood that these expressions would use the defined fields for the a, b, c, and d signals. The operators "then," "or," and "{}" are used to connect arithmetic/logic expressions to form regular expressions that are used in the finite automata according to the present invention. For example, suppose patterns of the a and b signals are of interest, in particular, at times $t_1$ and $t_2$. A concatenation of the two arithmetic/logic expression for use in searching is the following:

$$\text{(a \&\& !b) then (a \&\& b)} \tag{8}$$

If the alternation operation is used instead of the concatenation operation, the expression would be the following:

$$\text{(a \&\& !b) or (a \&\& d)} \tag{9}$$

Now if the desire is to search for situations in which there are a number of patterns like that at $t_2$ that follow a pattern like the one at $t_1$, the expression is as follows:

$$\text{((a \&\& !b \&\& !c) then} \tag{10}$$

$$\text{(a \&\& b \&\& !c)\{3\})}$$

The finite automata evaluate the arithmetic/logic expressions to determine whether such expressions are zero with regard to a row or portion of a row of the large trace array. If an arithmetic/logic expression is zero, then the value is considered "false" and the finite automata does not enter that next state specified by the transition function. If, however, the arithmetic/logic expression is not a zero, then its value is considered "true" and the finite automata enters the next state specified by the transition function.

Figure 7:
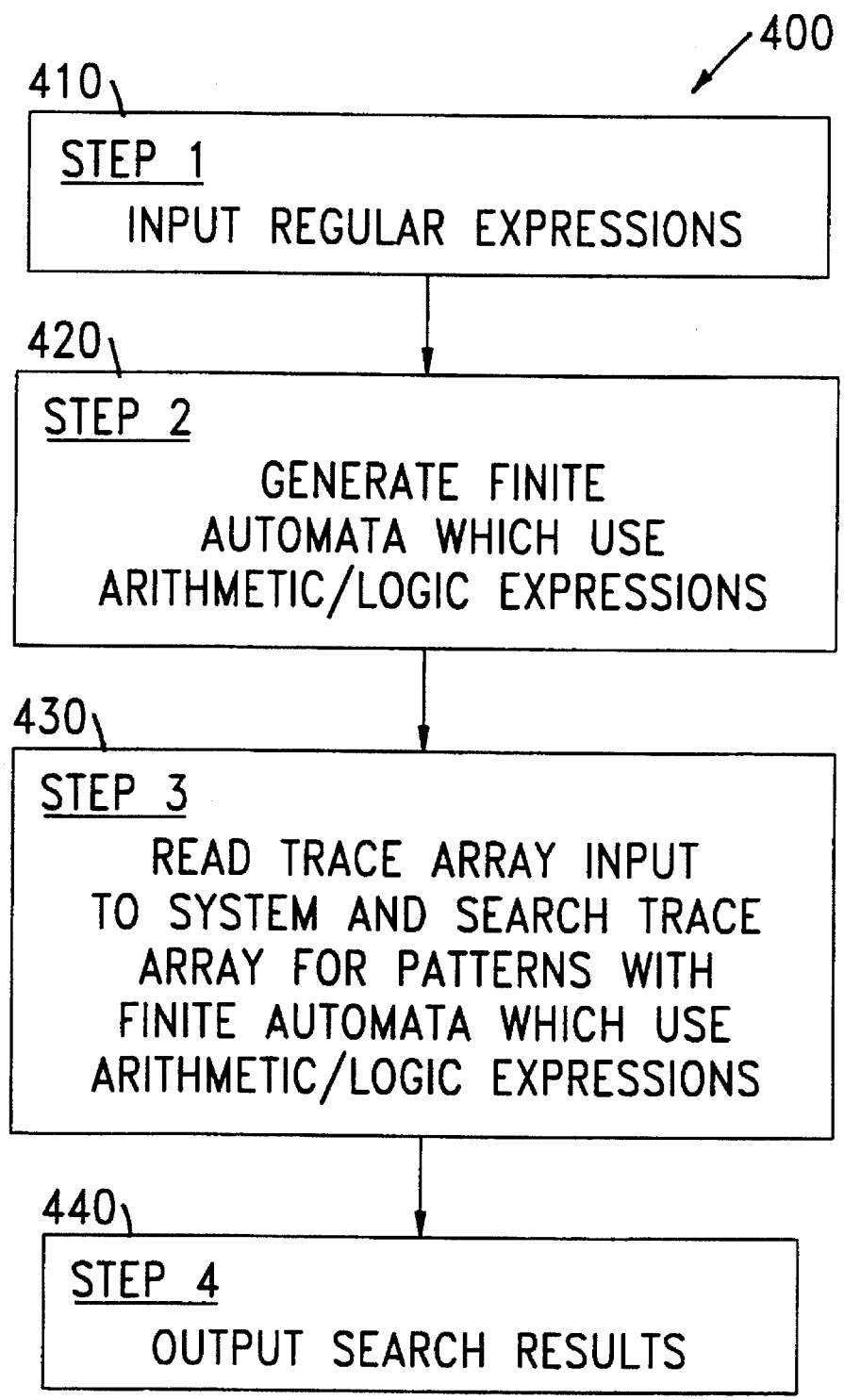
FIG. 7 shows the steps of the method of the present invention.

Referring to FIG. 7, the steps of the method of the present invention are shown generally at 400. According to the method, step 1 at 410 is where regular expressions that define the searches are input to the system capable of carrying out the search. At step 2 at 420, finite automata are generated which use arithmetic/logic expressions. Following step 2, there is step 3 at 430 where the large trace array that is input to the system capable of carrying out the search is read and searched with the finite automata which use arithmetic/logic expressions for desired patterns. And finally, at step 4 at 440, the results of the search are output from system 440 capable of carrying out the search.

Figure 8:
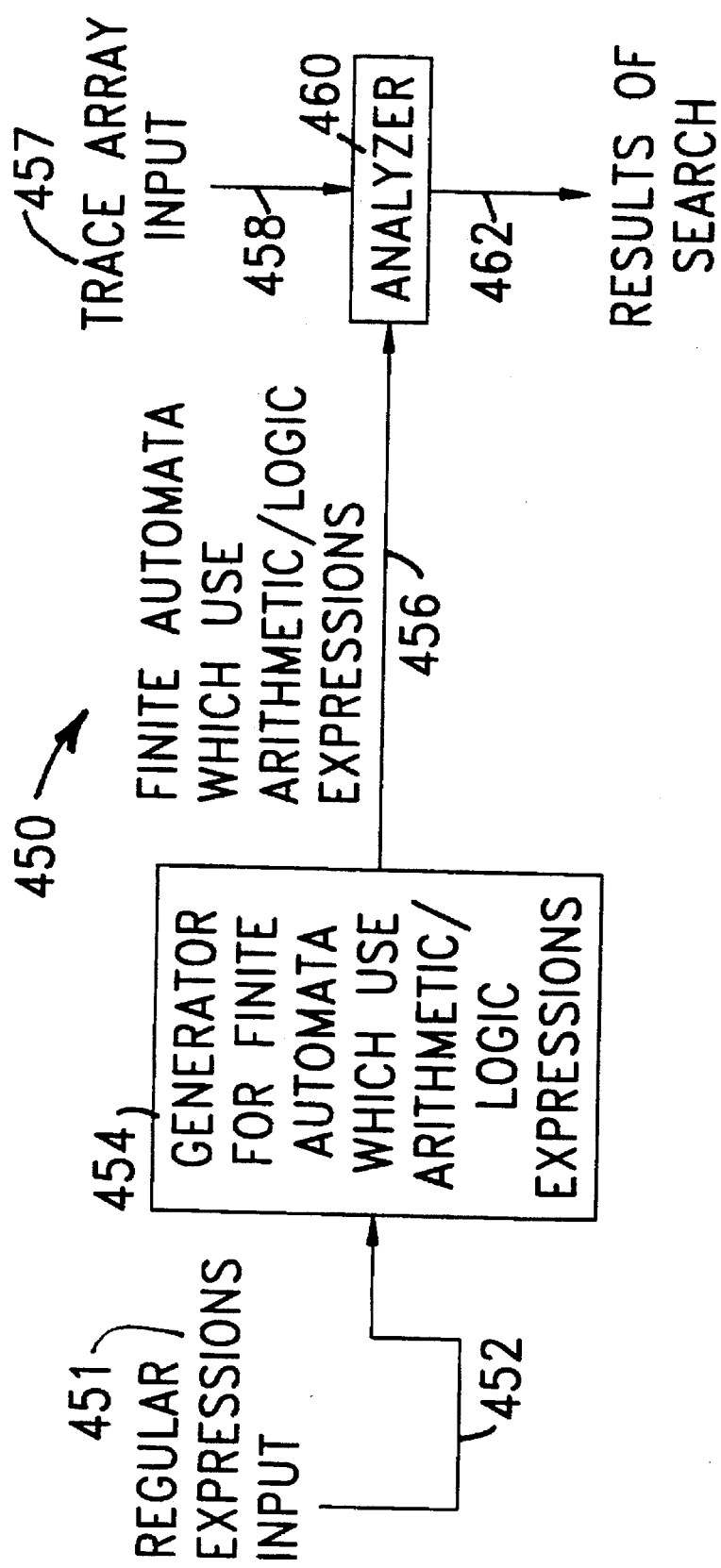
FIG. 8 is a block diagram of the system of the present invention that implements the method shown in FIG. 7.

FIG. 8 is a block diagram of the system of the present invention. The system is shown generally at 450. The first element of the system is regular expression input 451. The regular expressions that are used to define the search are input to the system here and fed to the next element of the system on line 452.

This next system element is generator 454. This generator is for generating finite automata which use arithmetic/logic expressions instead a particular symbol from a finite alphabet. The finite automata that are output from the generator are based on the regular expressions input to the system.

The finite automata that are output from generator 454 on line 456 are input to analyzer 460. The second input to the system is the large trace array that is input to analyzer 460 by way of trace array input 457 and input line 458.

The analyzer uses the finite automata to search the large trace array described above and the results of the search are output from analyzer 460 on line 462. It is understood that the generator and the analyzer may be configured as either special circuits or as a general purpose computer.

In accordance with the foregoing, the system and method of the present invention may be used for analyzing large trace arrays with finite automata using arithmetic/logic expressions.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A system for searching large trace arrays, comprising:
   first input means for receiving regular expressions, with the regular expressions defining desired patterns to be searched for in a large trace array;
   generator means connected to the input means for receiving the regular expression input at the input means and generating finite automata that use arithmetic/logic expressions;
   second input means for receiving the large trace array; and
   analyzer means that is connected to the second input means and an output of the generator means for searching for predetermined patterns of data in the trace array based on the finite automata which use arithmetic/logic expressions.

2. The system as recited in claim 1, wherein the large trace array has up to and greater than 192 columns for signals being sampled at a point in time.

3. The system as recited in claim 1, wherein the large trace array has up to and greater than 2,097,152 rows for samples of all signals that are taken.

4. The system as recited in claim 1, wherein the arithmetic/logic expressions permit the use of a substantially infinite alphabet.

5. The system as recited in claim 4, wherein the arithmetic/logic expressions may comprise predetermined operators, numbers, and fields.

6. The system as recited in claim 2, wherein the substantially infinite alphabet having a character set of $2^{192}$ and greater characters may be supported by using arithmetic/logic expressions.

7. A method for searching large trace arrays, comprising the steps of:
   (a) inputting regular expressions that define desired patterns to be searched for in a large trace array;
   (b) generating finite automata which use arithmetic/logic expressions from the regular expressions that were input;
   (c) reading the large trace array and searching for predetermined patterns of data with the finite automata which use arithmetic/logic expressions that were generated; and
   (d) outputting results of the search.

8. The method as recited in claim 7, wherein step (b) further comprises generating finite automata which use arithmetic/logic expressions, with the arithmetic/logic expressions permitting the use of a substantially infinite alphabet having a character set of up to and greater than at least $2^{192}$ characters.

9. The method as recited in claim 7, wherein the step (b) further comprises generating the finite automata which use the arithmetic/logic expressions that permit the use of a substantially infinite alphabet.

10. The method as recited in claim 9, wherein the step (b) further comprises generating finite automata which use arithmetic/logic expressions, with the expressions including predetermined operators, numbers, and fields.

11. In a system for searching large trace arrays that includes a first input for inputting regular expressions, a generator for generating finite automata from the regular expressions, a second input for inputting the large trace array, and an analyzer for searching the large trace array with the finite automata, the method of generating finite automata and searching large trace arrays, comprising the steps of:
   (a) defining arithmetic/logic expressions being based on fields, numbers, and operators which permits the use of a substantially infinite alphabet having a character set of up to and greater than at least $2^{192}$ characters, and
   (b) searching the large trace array with the finite automata and determining if the arithmetic/logic expressions evaluate to true or false for rows of the large trace array.

12. In a system for searching large trace arrays that includes a first input for inputting regular expressions, a generator for generating finite automata from the regular expressions, a second input for inputting the large trace array, and an analyzer for searching the large trace array with the finite automata, the method of generating finite automata and searching large trace files, comprises the steps of:
   (a) generating finite automata from regular expressions with the finite automata transition function being f(s,e), where,
      s=state of the finite automaton
      e=arithmetic/logical expression, and
   (b) searching the large trace array with the finite automata and determining if the arithmetic/logic expressions evaluate to true or false for rows of the large trace array.

\* \* \* \* \*